United States Patent [19]

Minegishi

[11] 3,768,818
[45] Oct. 30, 1973

[54] SPRING RING FOR A PISTON RING ASSEMBLY
[75] Inventor: Hiroshi Minegishi, Kawagoe, Japan
[73] Assignee: Nippon Piston Ring Co., Ltd., Tokyo, Japan
[22] Filed: Jan. 8, 1971
[21] Appl. No.: 104,877

[30] Foreign Application Priority Data
Jan. 12, 1970 Japan.................................. 45/3371

[52] U.S. Cl.................... 267/1.5, 277/139, 277/141
[51] Int. Cl............................................... F16f 1/34
[58] Field of Search.................... 277/138, 139, 141; 267/1.5

[56] References Cited
UNITED STATES PATENTS
3,353,830  11/1967  Bell................................. 267/1.5 X
656,562    8/1900   Myers................................ 277/139
2,776,865  1/1957   Anderson............................ 277/139
3,342,476  9/1967   Vossieck............................ 267/1.5
2,594,164  4/1952   Hedberg............................. 267/1.5

Primary Examiner—William F. O'Dea
Assistant Examiner—Peter D. Ferguson
Attorney—Sughrue, Rothwell, Mion, Zinn & Macpeak

[57] ABSTRACT

A spring ring for a piston ring assembly has an H-shaped cross section with the radially inner projection thicker than the raidally outer projection which in turn is thicker than the connecting portion and lateral slits extend radially inward, alternately from the peripheral edges to a slight center overlap.

1 Claim, 7 Drawing Figures

SPRING RING FOR A PISTON RING ASSEMBLY

BACKGROUND OF THE INVENTION

1. FIELD OF THE INVENTION

This invention relates to a spring ring used for the internal combustion engine equipped with a piston which has a piston ring groove of low axial depth not exceeding about 3.5 mm.

2. DESCRIPTION OF THE PRIOR ART

Oil scrape rings made of cast iron are widely used for internal combustion engines, but have low tensile strength because of their one-piece construction. Whereas, oil scrape rings made of high grade alloys have sufficiently high tensile strength but are expensive. Besides, such oil scrape rings cannot have wide oil windows due to their narrow thickness, and therefore the oil scraping ability of the oil ring is restricted. The design or the modification of the shape of the oil ring is also restricted by the existence of the oil windows.

SUMMARY OF THE INVENTION

The invention provides an improved spring ring made of a steel plate which eliminates the aforesaid defects in the conventional oil scraping rings, and also provides a method of producing the spring ring forming a portion of such an assembly.

More detailed embodiments of this invention will be explained with reference to the accompanying drawings.

DESCRIPTION OF THE PREFERRED EMBODIMENTS

Figure 1:
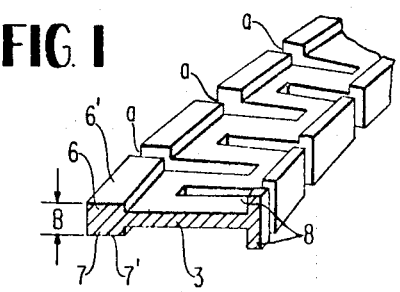
FIG. 1 is a schematic view of a portion of a spring ring for the piston ring assembly according to this invention.
Figure 2:
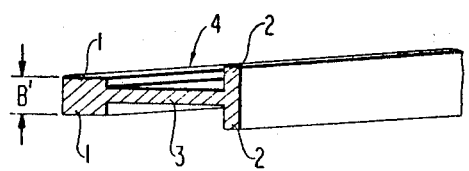
FIG. 2 is a schematic view of a part of a strip formed into the spring ring of FIG. 1.

Referring to FIG. 1, the spring ring of this invention has an approximately H-shaped cross section, and is composed of an outer projection having an upper supporting face 6 and a lower supporting face 7. An inner projection 8 has a thickness larger than the thickness B of the outer projection, and a connecting part 3 lying between said inner and outer projections has a thickness smaller than the outer projection thickness B. A plurality of lateral slits a are cut from the outer periphery of the ring along the radial direction, to the middle zone of the connecting part. Also, a plurality of lateral slits b are cut from the inner periphery of the ring, along the radial direction to the middle zone of the connecting part.

Figure 3:
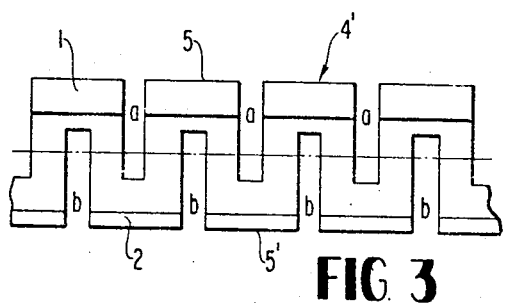
FIG. 3 is a plan view of the strip with a plurality of lateral slits perpendicular to the length of the same.

In the production of this spring ring, a steel or phosphor bronze plate or strip 4 having an H-shaped cross section and composed of an outer projection 1, an inner projection 2, and a connecting part 3 with the thickness smaller than the thickness B of said outer projection, is first worked to form a plurality of lateral slits a from an outer edge 5 of the rod to the middle zone of the connecting part and also lateral slits b from an inner edge of 5' of the strip to the middle zone of the connecting part, as shown in FIG. 3. Each of the slits a and each of the slits b are mutually arranged one after another.

Then the worked plate or strip is bent into a ring so that the edge 5 becomes the outer periphery. The formed ring has the structure as shown in FIG. 1.

Figure 4:
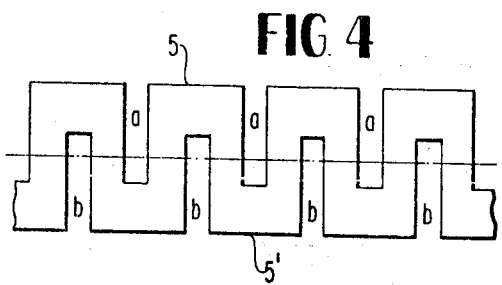
FIG. 4 is a plan view of another strip with lateral slits.
Figure 5:
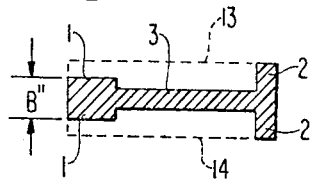
FIG. 5 is a cross section of the strip of FIG. 4, further worked to form the outer and inner projections.

Another method of producing the spring ring will be explained with reference to FIG. 4 and FIG. 5. A metal strip having a rectangular cross section is worked to form a plurality of lateral slits a from one edge 5 of the strip to the middle zone of the connecting part and also a plurality of lateral slits b from another edge 5' to the middle zone of the connecting part, as shown in FIG. 4. Then the upper face 13 and the lower face 14 of the slit strip are subjected to pressing, rolling, cutting or grinding to form the outer projections 1, the inner projections 2, and a connecting part 3 with a thickness lower than the thickness B'' of the said outer projection, as shown in FIG. 5. The dotted line, shows the starting cross section of the rod, and the hatched zone shows the cross section of the worked strip. After that, the worked strip is cut into the desired length and bent into a ring so that edge 5 becomes the outer periphery. Thus, the spring ring as shown in FIG. 1, composed of the outer projections 1 having the upper and lower supporting faces 6 and 7, inner projections 2, and the connecting part 3, is obtained.

Figure 6:
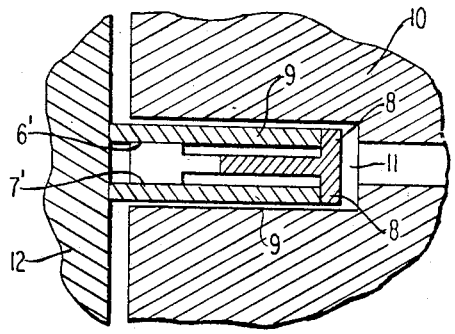
FIG. 6 is a cross section of the piston ring groove of a piston, carrying both the spring ring and a pair of low thickness scraper rings.

Referring to FIG 6, a pair of thin scraper rings 9 are applied to both supporting faces 6' and 7' of the outer projection of the spring ring; this assembly of the spring ring and the thin rings is inserted into a piston ring groove 11 of a piston 10; and the piston 10 is inserted into a cylinder 12.

As particularly mentioned above, a spring ring can be produced with ease according to this invention, and the thickness of the spring ring can be minimized by putting the latter between a pair of thin rings 9. Therefore, the spring ring of this invention is well suited for inserting into a narrow piston ring groove.

Besides, this spring ring has the following advantages:

1. The spring ring of this invention exhibits high tensile strength as compared with the conventional cast iron oil scraping ring.

2. The spring ring of this invention fits well to the inner wall of the cylinder due to its flexible structure caused by the plurality of lateral slits.

3. The spring ring of this invention has a good oil scraping property as compared with conventional cast iron oil scraping rings.

Figure 7:
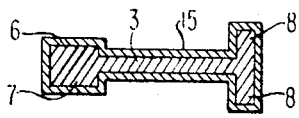
FIG. 7 is a cross section of a spring ring of this invention with a Cr plating layer.

In order to increase the wear resistance of the spring ring of this invention and to smoothly flow the scraped lubricating oil, the surface of the spring ring carries a Cr plating layer 15, as shown in FIG. 7. In addition to that, if the spring ring of this invention is produced from stainless steel, for example 17-7 PH steel, the mechanical properties of this spring ring are remarkably increased to fully eliminate breaking defects.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. A spring ring for a piston ring assembly, said ring comprising:

an essentially solid, continuous ring member including a radial connecting part connecting outer and inner axial projections to each side of the connecting part, said inner projection having a thickness greater than that of the outer projection, and said connecting part between said projections having a thickness smaller than that of the outer projection, and a plurality of narrow, lateral slits extending radially from the inner and outer peripheries of the ring in alternating fashion toward the middle zone of the connecting part and defining therebetween ring portions of H shape cross section.

* * * * *